United States Patent [19]

Innes

[11] 4,429,780

[45] Feb. 7, 1984

[54] DEVICE FOR DEPOSITING GOODS ONTO CONVEYOR BELTS OR THE LIKE

[75] Inventor: Jim Innes, Kitchener, Canada

[73] Assignee: Santrade Ltd., Lucerne, Switzerland

[21] Appl. No.: 287,062

[22] Filed: Jul. 27, 1981

[30] Foreign Application Priority Data

Aug. 1, 1980 [DE] Fed. Rep. of Germany ....... 3029159
Dec. 3, 1980 [DE] Fed. Rep. of Germany ....... 3045616

[51] Int. Cl.³ .............................................. B65G 47/26
[52] U.S. Cl. ..................................... 198/424; 198/704
[58] Field of Search ............... 198/424, 432, 480, 646, 198/803, 427, 704, 369, 370, 365; 53/251

[56] References Cited

U.S. PATENT DOCUMENTS 3,150,775  9/1964  Barrett ........................... 198/803 X
3,797,636  3/1974  MacDonald ....................... 198/803
4,174,773  11/1979  Venzke ............................ 198/365

Primary Examiner—Joseph E. Valenza
Assistant Examiner—Dennis J. Williamson
Attorney, Agent, or Firm—Burns, Doane, Swecker & Mathis

[57] ABSTRACT

A device is disclosed for transferring pieces of goods onto conveyor belts or the like, particularly for pieces susceptible to deformation made from dough-like material, wherein pre-molded individual pieces are delivered to a conveyor belt and are transferred onto the same by a transfer device. The transfer device consists of a rotatable transfer table which is provided in the region of its periphery with swingably mounted transfer plates for the individual pieces and at least a part of the region of the transfer table is disposed above the conveyor belt, the transfer plates being downwardly swingable by a control device within the region of the table.

16 Claims, 9 Drawing Figures

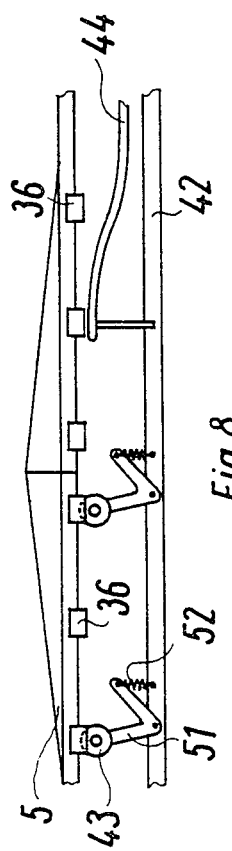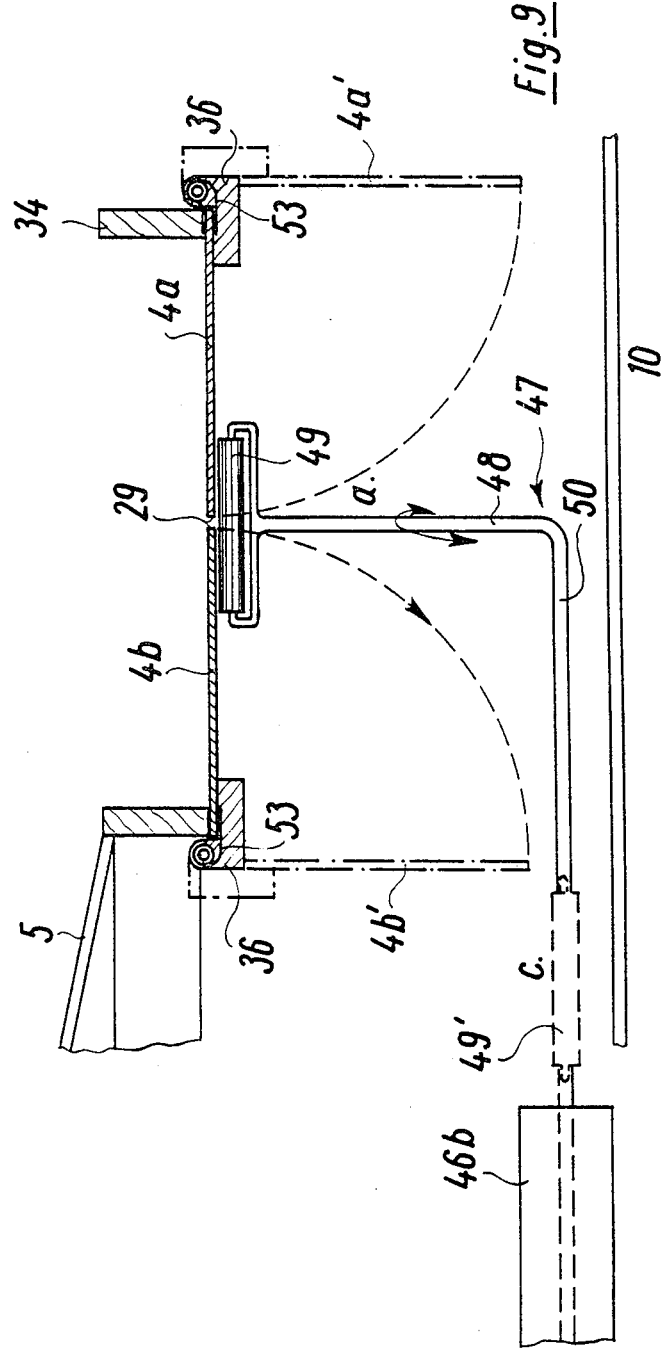

DEVICE FOR DEPOSITING GOODS ONTO CONVEYOR BELTS OR THE LIKE

FIELD OF THE INVENTION

The invention relates to a device for depositing of piece goods onto conveyor belts or the like, particularly for workpieces susceptible to deformation, from dough-like materials, wherein the preformed individual pieces are delivered to a conveyor belt or the like and are transferred onto same by a transfer device.

BACKGROUND OF THE INVENTION

Such transfer devices are known. They are provided, for instance, in the fish or meat processing industry, in association with conveyor belts which are to convey individual portions of fish fillet or of chopped meat patties such as hamburger patties to a freezing device. In the known structures, suitable forming or molding devices by which the individual workpieces or chopped meat patties are formed, are associated with swinging or reciprocating chutes transferring the individual portions on the chute so that the chopped meat patties ageous in these structures that the transfer point can be influenced by frictional effects of the chute so that the chopped meat patties or the fish fillets can occasionally be deposited onto pieces already placed on the belt, or that they fall, during the transfer, onto their edges and are thus deformed in undesired way. This is the case particularly when the transfer speed is high.

It is an object of the invention to enable the depositing of such deformation susceptible individual pieces quickly and safely onto conveyor belts such that the guarantee is achieved for the positioning without tipping over of the conveyed workpieces even at high speed of transfer.

SUMMARY OF THE INVENTION

The invention resides in that the transfer device consists of a pivotal transfer table which is provided in the region of its periphery with swingably mounted transfer plates for the individual workpieces, that at least a section of the transfer table is disposed above the conveyor belt and that the transfer plates are downwardly swingable, by a control device in the said section. This arrangement provides the advantage that, so to speak, at the transfer point, the bottom is removed from below the dough-like workpieces previously placed on the transfer plates so that they fall downwards from their original position without any tipping over motion and drop flat in as a dense as possible arrangement onto the conveyor belt disposed underneath the transfer plates. It has been shown as very advantageous and useful if the swing axes of the transfer plates are tangential to the path of motion of the transfer table as then considerably narrow and long transfer plates can be made which, due to their small width, enable the obtaining of a small spacing between the conveyor belt underneath the transfer table. It is also particularly advantageous if the swinging transfer plates of each pair, swingable in mutually opposite directions, are so arranged that they abut against each other with their swinging free end edges, as such embodiment provides the advantage that the force effects still possibly transmitted from the plates onto the workpieces during the transfer process negate each other in opposite directions. Furthermore, in this embodiment, the width of the transfer plates can be made still smaller, that is, can be of the size order of one-half of the diameter of the workpieces to be transferred so that even the possibility of arranging the conveyor belt immediately underneath the transfer table is achieved.

The transfer plates are preferably provided with a swinging drive releasable by a control device. By such arrangement, it is achieved that the transfer plates open downwards so fast that the transferred products are not drawn down by the motion of the plates due to their inertia but instead, since the bottom is no longer present at the transfer point, the workpieces freely fall down and are not distorted in shape. It has been shown that this type of transfer can be effected very safely and that it is particularly suitable for the above mentioned fish fillets or for so-called hamburgers as by the flat fall onto the conveyor belt the shape of the individual workpieces is not influenced disadvantageously but always to advantage.

In a particularly advantageous embodiment, the transfer plates can form the bottom of transfer compartments formed by frames at the periphery of the transfer table and by the transfer plates. In such embodiment, it is possible to provide the transfer table itself with a slightly conically upwardly extending center cover plate onto which, for instance, the individual workpieces can be conveyed from the forming device. The arrangement can be then made such that the individual pieces either automatically slide down into the transfer compartment at the periphery during the rotary motion, or they can be simply drawn and placed into the transfer compartments by an operator. The subsequent transfer process then takes place automatically as a result of advantageous realization possibilities for the swinging drive of the transfer plates apparent from the dependent claims. The overall arrangement can also be preferably built such that downstream of the transfer point in the direction of rotation of the table, at least one cleaning device is provided for the transfer plates which stay in an open state at least up the cleaning device and only then are they closed again by the control device. In this embodiment, it is only necessary to take care that when the individual workpieces are brought from top onto the slightly conical cover plate in the above mentioned way, they be transferred only in the region wherein the transfer plates are closed again.

This embodiment produces the advantage that with such a swing drive, the object of a quick and safe placing of individual workpieces susceptible to deformation onto the conveyor belts can be solved in an advantageous way. The production cost required for same, however, is relatively high due to the swing drive.

The entire object can be solved particularly simply in another embodiment such that at least one supporting roller is provided as a control device in the section of the transfer table disposed above the conveyor belt, which roller is swingable from a position supporting the transfer plates to a position setting the plates free. Proceeding from the perception that the own weight of the plates can be utilized for the opening of the closed transfer plates, according to the present invention, the closed transfer plates are held, while disposed near and above the conveyor belt, such that the supporting rollers press against the plates from below thus preventing their opening. Above the conveyor belt is arranged a supporting roller which can be brought into a position in which it releases the transfer plates. The release is effected by swinging away or by withdrawal of the supporting roller. The transfer plates then effect a downward swinging motion, due to their own weight and due to the weight of the patties and secure that the individual pieces (patties) fall quickly and safely onto the conveyor belt. Thus, no additional drive for the opening of the plates is required which considerably reduces the production costs. The supporting roller can be preferably disposed on the shorter shank of an L-shaped control arm associated with a pressure cylinder. Due to the use of a control arm, the pressure cylinder can be arranged below the contour of the transfer table, wherein sufficient space is available for same.

In a more advantageous way, the pressure cylinder is arranged within a plane parallel with the plane of conveying, within which the longer shank of the control arm is also located such that the pressure cylinder can pull the support roller by the control arms into the contour of the transfer table, that is to say, backwards underneath the transfer plates. This rearwards directed withdrawl motion of the control arm is overlapped by the swinging motion of the same so that the particular opening step is so achieved that the pressure cylinder pulls the roller underneath the transfer plates with a swinging motion of the short shank of the control arm, into the contour of the transfer table, that is, rearwards. By doing so, the region of the conveyor belt disposed underneath the transfer plates is fully free and the transfer of the particles in such region is not hindered by a control arm possibly disposed within such region.

In a more advantageous way, the subsequent closing of the plates is effected by guide rails disposed underneath the level of the transfer plates and so bent that as the table turns, they first receive between themselves the open plates and, on further turning of the table, bring the plates into their closed position. In such arrangement, no separate swing drive is required even for the closing of the plates.

Since the speed of opening of the transfer plates plays a role in a quick and safe depositing of the individual workpieces onto the conveyor belt, it may be feasible to provide the transfer plates with resilient load in the swing direction. Thus, the opening force can be increased whereby the duration of the opening process is shortened.

For peripheral guiding of the transfer plates in a closed state, it is suitable if they are held together by guide rolls pressing from underneath against the closed transfer plates. For this purpose two guide rolls can be provided at each side in order to secure a safe support of the transfer plates over the entire range of the rotary movement during which the plates are to be maintained in closed state. These guide rolls can be produced from plastic material and thus provide a low noise passage of the transfer plates over the rolls.

BRIEF DESCRIPTION OF THE DRAWINGS

The invention is illustrated by way of exemplary embodiments when in the drawings and explained in the following description.

In the drawings:

FIG. 8 is a side view II—II of FIG. 7; and

FIG. 9 is a partial section on enlarged scale, along the line III—III of FIG. 7 through a transfer compartment with a supporting roller.

DESCRIPTION OF THE PREFERRED EMBODIMENT

Figure 1:
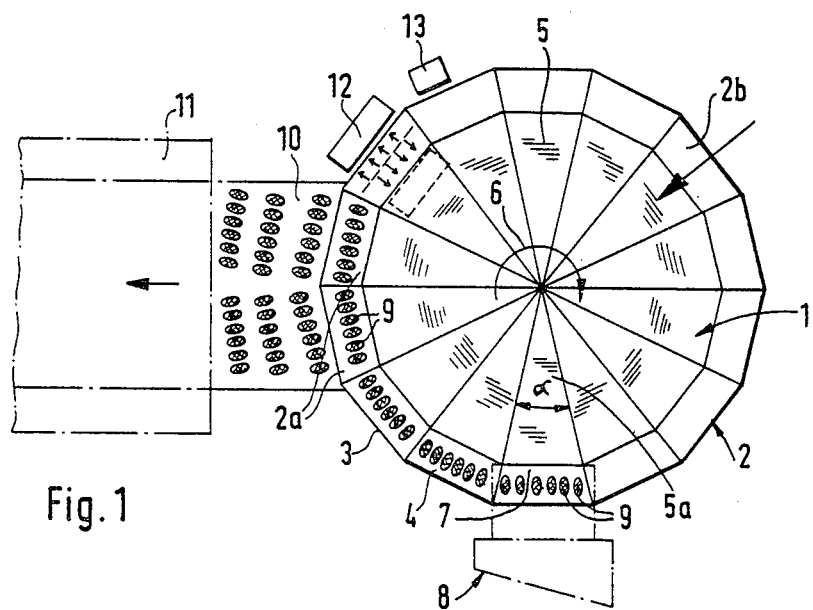
FIG. 1 is a diagrammatic plan view of a device according to the present invention for depositing of food pieces onto an infeed belt of a freezing device.

In FIG. 1 is shown diagrammatically a rotary transfer table 1 provided at its periphery with a number of compartments 2 extending tangentially to its direction of rotation and which, in a way to be described later in greater detail, are each comprised of a frame 3 and a bottom formed from swingably mounted transfer plates 4. The remainder of the surface of the transfer table 1 is covered by a slightly conically upwardly extending cover hub 5. The cover hub 5 assumes, in the shown embodiment, the shape of a flat pyramid with fourteen sides each of which is associated with one transfer compartment 2 disposed at the lower end of the side wall, i.e. at the periphery of the transfer table 1. The transfer table 1 rotates in the direction of arrow 6 in step-wise fashion, namely over the angle, including the size of one side wall 5a of the cover hub 5. The rotary motion is so selected that each transfer compartment 2 becomes aligned under a feeding station 7 of a forming device 8 not shown in greater detail, for chopped meat patties also referred to as so-called hamburgers. From the feeding station 7 come, in the exemplary embodiment, upon the standstill of the transfer table 1, rows each of six individual chopped meat patties onto the transfer compartment 2 disposed therebelow and are further advanced therefrom in step-wise fashion in the direction of arrow VI until the compartments 2 assume the position 2a above a conveyor belt 10 of a freezing device. The transfer plates 4, as will be later described in greater detail, consist each of flaps arranged in pairs, form the bottom of compartments 2 until such compartments have assumed the position 2a above the conveyor belt 10. The flaps 4 are then quickly swung downwards so that 12 chopped meat pieces 9 disposed in the two compartments 2a above the conveyor belt 10 fall downwards onto the conveyor belt 10. Thereafter, they are conveyed into the freezing device 11.

On further rotation of the transfer table 1, the still open flaps 4 are sprayed by a cleaning device 12, for instance with hot water, wherein the spray nozzles can be brought between the downwardly hanging flaps 4. Naturally, it would also be possible, as will become apparent later on, to further open the flaps 4 in order to enable their cleaning. The flaps 4 can then be sprayed with cold water and, if desired, further mechanically cleaned by a brush 13 or the like prior to the spraying with a further dose of cold water. Following the cleaning step, the transfer plates 4 are again closed so that from the position 2b on, the transfer compartments 2 again have a closed bottom. Instead of the inlet device 7 of the forming machine 8, it is also possible to convey the individual pieces in the direction of arrow 14 onto the cover hub 5 so that the pieces can slide from same on the respective side walls 5a down into the compartments 2 or can be pulled by an operator from the hub 5 down into the compartments 2. The subsequent transfer process then follows as explained above.

Figure 2:
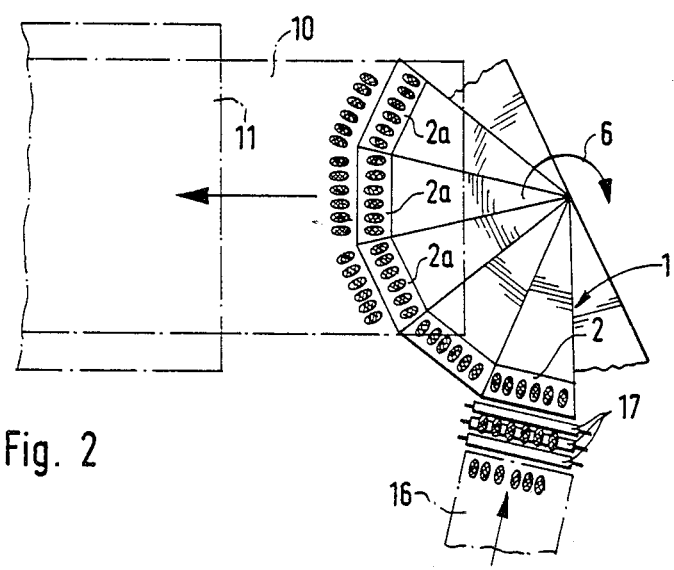
FIG. 2 is a device according to FIG. 1 but having an alternatively built infeed device to the rotary transfer table.
Figure 3:
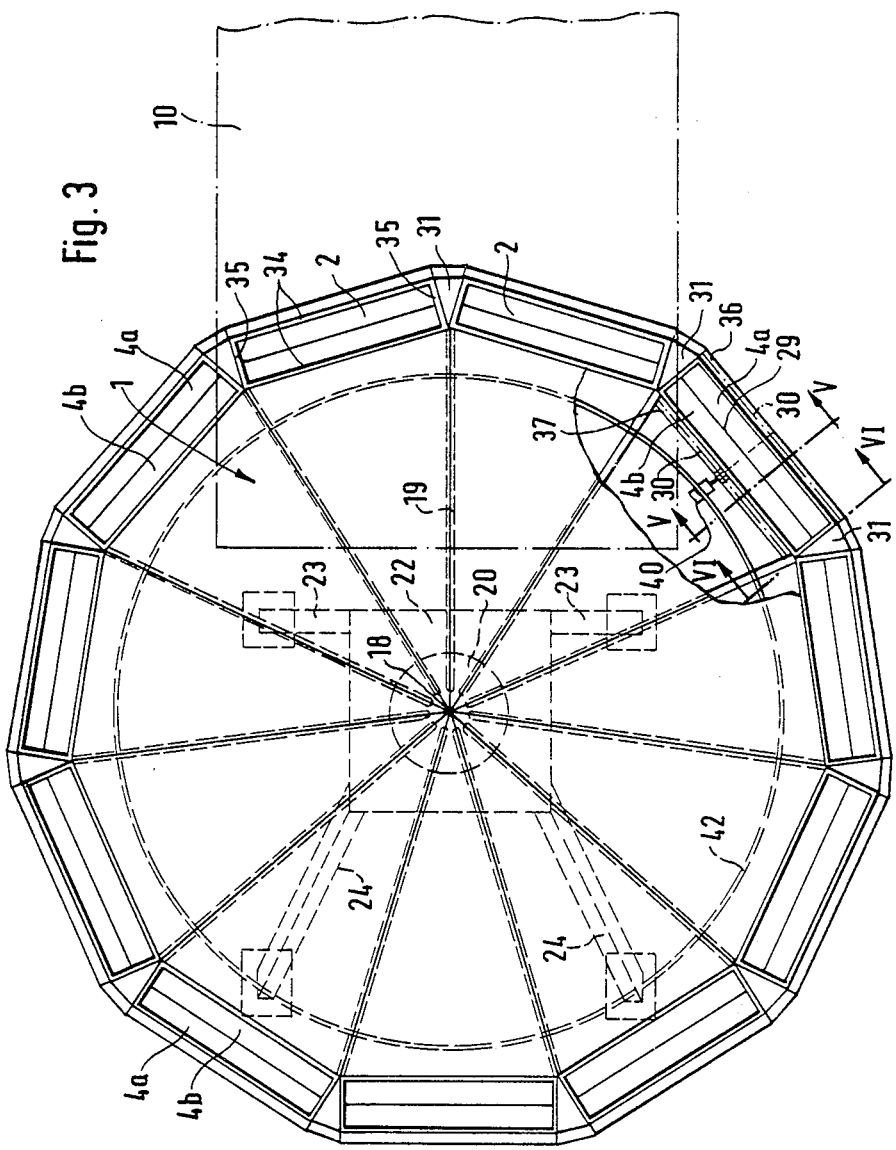
FIG. 3 is a plan view of the transfer table of FIGS. 1 and 2 in one embodiment and on enlarged scale.

FIG. 2 shows a device similar to that of FIG. 1. Here, however, three compartments are simultaneously opened at the position 2a. The speed of transfer can thus be increased. Besides, it is seen from the exemplary embodiment of FIG. 2 that the individual food workpieces which, naturally can also be correspondingly preformed fish fillets instead of the chopped meat pieces, are delivered from a conveyor belt 16 over a series of driven rollers 17 into the respective compartment 2 disposed in front of the conveyor belt 16. The feeding of the individual workpieces to the transfer table 1 is not critical. It is critical that the compartments 2 be provided in all cases at the periphery of the transfer table 1, whose bottom can quickly open within the region above the conveyor belt 10 in downward direction so that the workpieces disposed in the compartments 2 can freely fall downwards onto the conveyor belt 10.

FIGS. 3 to 6 particularly explain how the compartments and the transfer plates can be disposed in order to be able to carry out the transfer in downwards direction. It follows from FIGS. 3 and 4 that the transfer table 1 consists of a table structure formed from a plurality of support rods 19 extending radially to the pivot axis 18. The table structure is connected by a central plate 20 with a pivot axis 21 mounted vertically downwardly in a supporting structure 22. The supporting structure 22 consists of support legs 23 and 24 of which the support legs 23 are vertical and the legs 24 extend at an inclination, in order to increase the bearing surface area at the base 25. In the supporting structure 22 is further provided a drive motor 26 for generating rotary motion, which is connected with the pivot axis 21 over a drive 27 and a coupling 28. The step-wise drive can be effected either such that the motor 26 is engageable in steps, or the step-wise drive can be effected at the coupling or at the drive.

At the periphery of the transfer table 1 are formed transfer compartments whose bottom consists of two transfer plates 4a, 4b which are in mutual abutment at their free end edges 29 and each of which is swingably mounted for downward swinging about the axis 30 which are approximately tangential to the circular direction of movement of the transfer table about the axis 18. Between each pair of adjacent transfer compartments 2 are disposed approximately triangular or trapezoidal intermediate pieces 31 serving the purpose of maintaining the individual surfaces of the transfer compartments 2 at right angles.

Figure 4:
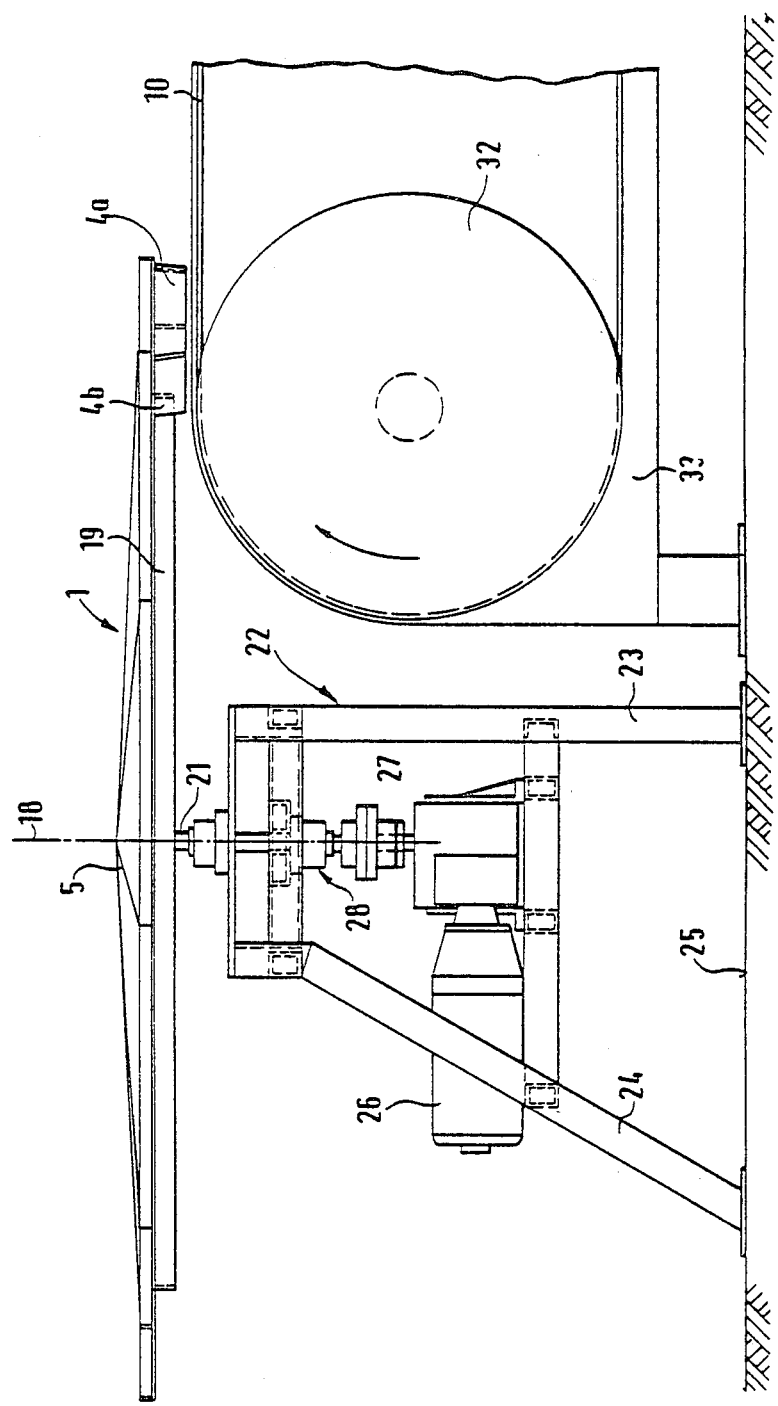
FIG. 4 is a side view of the transfer table of FIG. 3.

Below a region of the transfer table 1 reaches the conveyor belt 10 which, as is apparent from FIG. 4, runs over an idler roll 32 likewise secured to a supporting structure 33 fixed to the ground. It is also apparent from FIG. 4 that in this region the transfer plates 4a and 4b above the conveyor belt 10 are open so that at this point the pieces disposed within the transfer compartments 2 fall out onto the conveyor belt 10.

Figure 5:
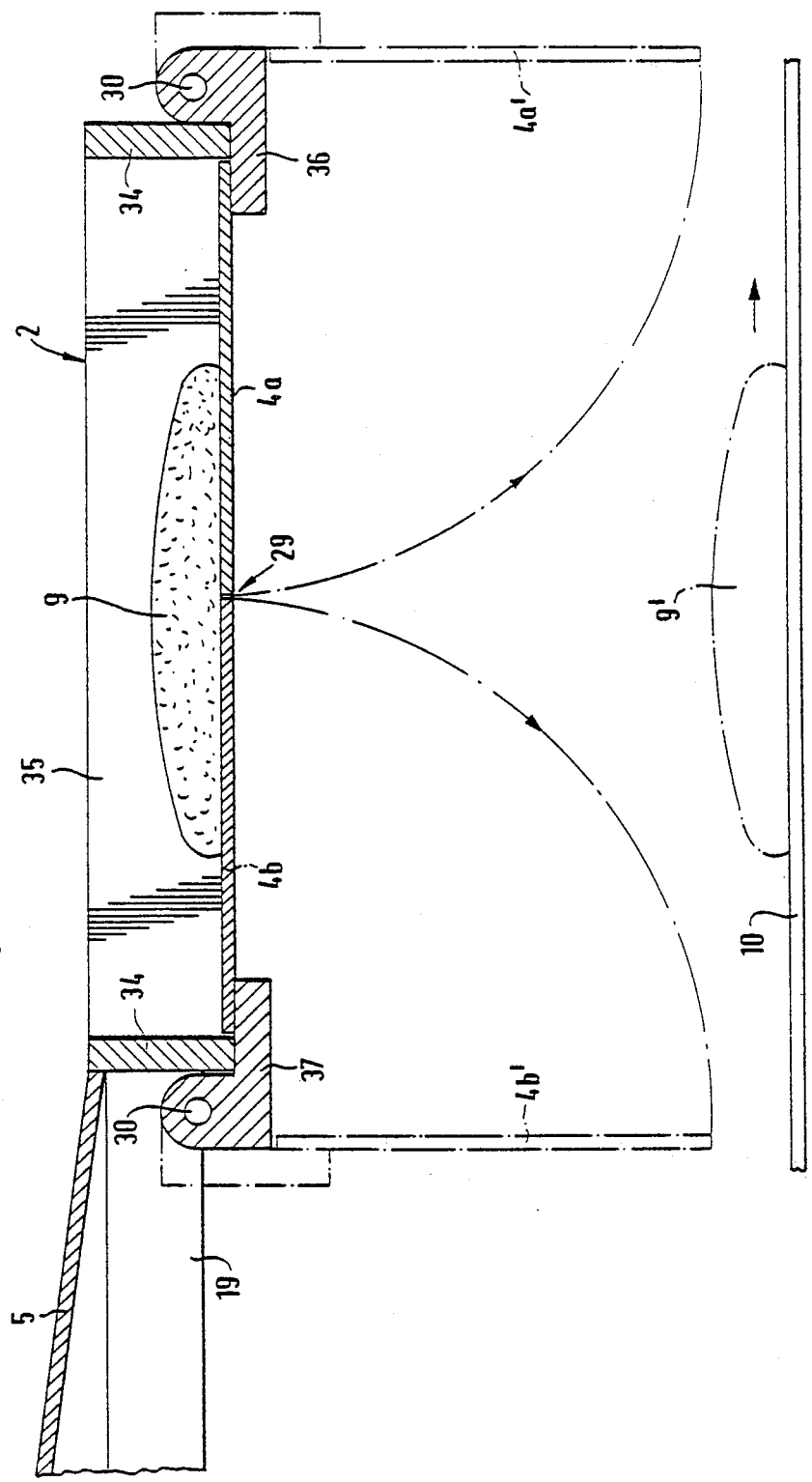
FIG. 5 is a partial section, on enlarged scale, of a transfer compartment of the transfer table of FIG. 3, along the line V—V.
Figure 6:
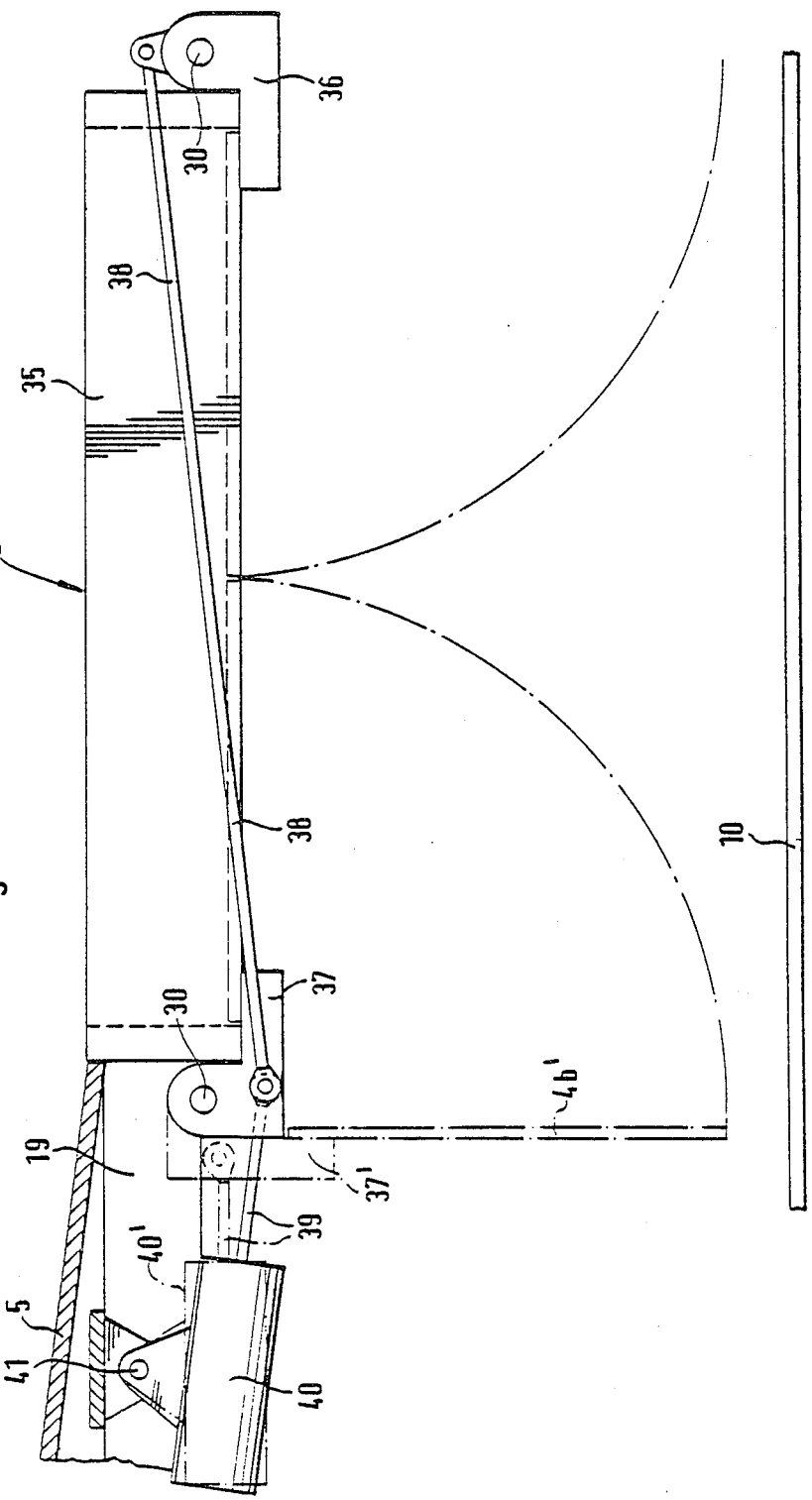
FIG. 6 is section VI—VI of FIG. 3.

It is shown in FIG. 5 that the individual transfer compartments 2 are each formed by rods 34, 35 surrounding the area of the transfer plates 4a, 4b in a frame-like fashion. It is also apparent from FIG. 5 that the chopped meat patties 9 are deposited in the compartments such that they each partly rest on the transfer plate 4a and partly on the transfer plate 4b in abutment at edges 29. Both the transfer plate 4a and the transfer plate 4b are connected at their edges remote from the edge 29 with swing hinges 36, 37 secured, in a way not described in greater detail, to the transfer table 1 and to the frame portions 34 and the struts 19, respectively, by way of pivot axes 30. Thus, it follows from FIG. 5 that when the flaps 4a and 4b are swung downwardly into the broken line position 4b' by a not yet described control and drive arrangement which, however, is shown in FIG. 6, then the pieces 9 disposed within the compartments 2 fall freely down due to their weight following the quick opening of the transfer plates 4a, 4b, and then assume the position 9' on the conveyor belt 10. In the shown embodiment, it is thus possible to make the spacing between the closed transfer plates 4a, 4b and the top surface of the conveyor belt 10 very small, for instance even less than 10 cm so that the free fall of the workpieces 9 does not have disadvantageous effects that would bring about undesired deformation of workpieces 9. The workpieces 9 fall flat onto the conveyor belt 10 so that the drawback of the known embodiments wherein the workpieces fall partly onto their edge is avoided.

FIG. 6 shows by way of an embodiment, how the drive for the opening of the transfer plates 4a, 4b in opposite directions can be effected. For this purpose, both of the hinges 36,37 are fixedly connected in the region underneath the intermediate members 31 of the transfer table 1 by a rod 38 extending generally parallel to the side portion of the frame along a transfer compartment 2. The rod 38 thus engages with the hinge 36 above the pivot axis 20 and with the hinge 37 underneath the pivot axis 30 so that a swinging motion of the hinges 37 in clockwise direction gives rise to the corresponding swinging motion of the hinge 36 in counter-clockwise direction. With the hinge 37 engages, approximately in its center (see FIG. 7), an end of a piston rod 39 associated with a pneumatic cylinder 40 which, in turn, is pivotal at point 41 on a connecting rod 41 (FIG. 3) of the struts 19 or on another part fixedly secured to the table structure. By a control device not shown in greater detail, which can be associated, for instance, with a valve opening cam disposed at the underside of the transfer table 1, the pneumatic cylinder is so actuated when the associated compartment is disposed above the conveyor belt 10, that the piston rod 29 is pulled inside the cylinder 40. In so doing, the hinge 37 and transfer plate 4b associated therewith performs a swinging motion clock-wise and is swung into an end position 37' shown in broken lines, in which the pneumatic cylinder 40 assumes the position 40'. Simultaneously therewith, the hinge 36 swings in opposite direction so that a fast opening of the flap-like transfer plates 4a, 4b is effected with the plates thus quickly removed from under the workpieces 9, which can then fall freely down and are properly positioned without having been subjected to any tipping motion.

Figure 7:
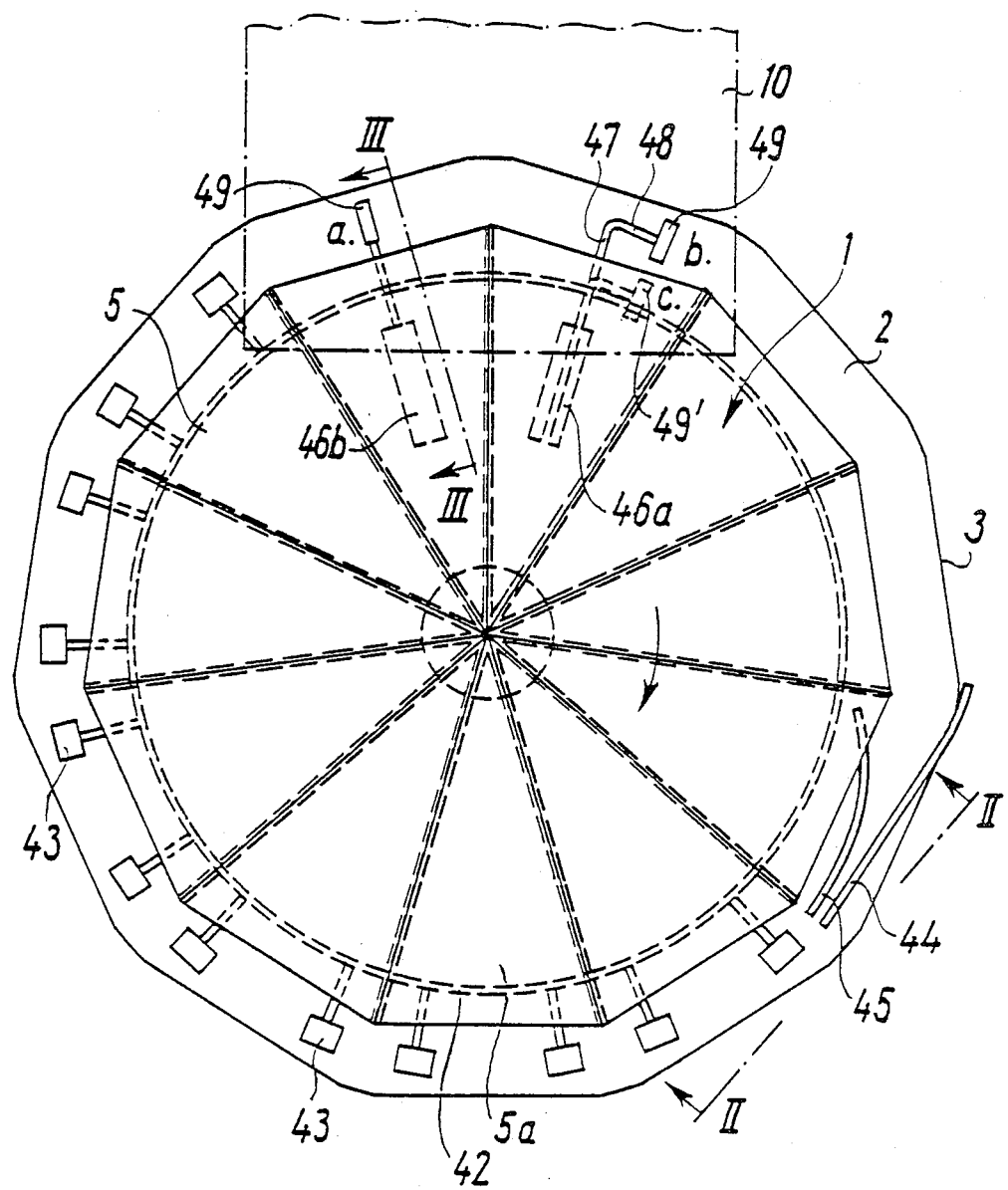
FIG. 7 is a plan view of another embodiment of the transfer table without transfer plates.

The cleaning device 12 of FIG. 1 is not shown in detail. It is, however, of conventional type, as is the infeed device 14 by which, contrary to the infeed devices shown in FIGS. 1 and 2, the individual workpieces 9 can be deposited directly onto the surface of the cover plate 5. Further shown in FIG. 7 is a transfer table 1 rotating in the direction of the arrow and in which arrangements have been made with respect to the structure of the transfer plates forming the transfer compartments, to enable the provision of a guide roller 43, a support roller 49 and guide rails 44. The guide rollers are provided underneath the path of motion of the transfer compartments 2, in a region thereof wherein the not shown transfer plates maintain the transfer compartments closed. The support rolls are disposed within the region which is above the conveyor belt 10 and in which the workpieces are placed for subsequent removal. In the region near the conveyor belt 10—seen in the direction of rotation of the transfer table—the control rails 44 are provided underneath the table surface, by which the still open transfer plates are brought into a closed position.

In this embodiment, the opening of the flipping-open of the transfer plates is effected by means of the support rollers 49, of which one or more are arranged in the region of the side wall 5a between the conveyor belt 10 and the transfer compartments. The supporting rollers 49 are controlled by a pneumatic cylinder 46a and 46b, and by an L-shaped control arm 47 such that they can assume positions shown with a, b, and c.

By the turning of the control rails 44 disposed below as well as of the support rollers 49, the transfer plates are maintained in the closed position when they are brought above the conveyor belt 10 (from the left of the Figure). The function of the guide rollers 43 is taken over by supporting rollers 49 which are now in the position a. By actuation of the pneumatic cylinder 46b and 46a, the supporting roller 49 can be brought, by a swing-and-radially inward motion relative to the transfer table, over the position b into the position c with the result that the opening of the flaps follows. This can take place very quickly since, by the assistance of the L-shaped control arm 47, the roller first moves down under the transfer plates and then, on a simultaneous swing-and-withdrawal motion, into the position c. After the individual workpieces, e.g. chopped meat patties, have been deposited onto the conveyor belt 10, the supporting roller 49 is again brought into the position a while the flaps are still in an open state. On a subsequent further rotation of the transfer table 1, the support rollers disposed in the position a will support the transfer plates of the following transfer compartment so long as a renewed actuation of the pneumatic cylinder is effected. The closing of the flaps is effected by control rails 44 arranged underneath the transfer compartments such that they receive the transfer plates therebetween and, on further rotation of the transfer table, are brought into a closed position, for which purpose the rails are suitably bent as is also apparent from FIG. 8. Further guiding of the transfer plates is then taken over by guide roller 43 on which the transfer plates rest and, on further turning of the transfer table, are moved on at a low noise. For this purpose, the guide rollers 43 are secured to a connection rod 42.

In FIG. 8 is shown how the guide rollers can be secured to the connecting rod 42. In this embodiment, a lever arm 51 is provided for such purpose, which presses the guide rollers 43, over a spring 52, from below against the transfer plates such that the same are held together. The control of the closing step of the transfer plates can be achieved by suitably bent guide rails of which the rail 44 is shown in FIG. 8, extending from the connecting rod 42 up to a level disposed directly underneath the transfer plates. The guide rail 45 is arranged in a similarly raising shape. Thus, the control of the closing step is achieved without the need for a pneumatic or other drive means operatively associated with the hinges 36.

In the partial cross-section shown in FIG. 9, along the like III—III, is shown the arrangement of the support rollers. The transfer compartment is formed from the frame portion 34 and from the transfer plates 4a and 4b, which are maintained, in the region of their free edges 29, in a closed position by one or more of the support rollers 49. The support roller 49 is mounted on the shorter shank 48 of an L-shaped arm 47 whose longer shank 50 is disposed within a horizontal plane coincident with the cylinder 46b and can be drawn in it. The longer shank 50 of the control arm 47 and the pneumatic cylinder 46b are disposed within a plane which is underneath a connection line between the free edges of the transfer plates 4a, 4b when assuming the open position, in order to enable the bringing of the supporting roller 49 into the position c. The opening of the transfer plates occurs only by simultaneous swinging and withdrawal motion so that at the end of the opening step the shorter shank 48 and thus the roller 49 is in the same level as the conveyor belt 10, in the position c.

In this embodiment, the flaps 4a and 4b are open by their own weight and by the weight of the chopped meat patties or the like deposited thereon. This is effected so quickly that a deformation or a sticking of the chopped meat patties on the transfer plates does not occur. In order to expedite the opening step, spiral springs 53 can be arranged in a known way within the region of the hinges 36 of the transfer plates 4a and 4b which are effective at the hinges to force the opening of the plates.

In general, in this embodiment of the invention, apart from the pneumatic cylinders 4a and 4b operating the supporting rollers, no further drive aggregates are required, whether electrical, hydraulic or pneumatic, whereby the manufacturing costs can be maintained low thus also reducing the overall manufacturing cost of the transfer table.

I claim:

1. A device for transfer of piece goods onto conveyor belts or the like, particularly for pieces susceptible to deformation, made from dough-like material, wherein the premolded individual pieces are delivered to a conveyor belt and are transferred onto same by a transfer device, characterized in that the transfer device comprises a rotatable transfer table which is provided in the region of its periphery with swingably mounted transfer plates for the individual pieces, at least a part of the region of the transfer table is disposed above the conveyor belt, the transfer plates are downwardly swingable by a control device within the said region of the table, the swing axes of the transfer plates extend tangentially to the path of motion of the transfer table, and said oppositely swingable transfer plates are so arranged with respect to each other that they abut against each other with their freely swingable edges.

2. A device according to claim 1, characterized in that the transfer plates are provided with a swing drive which is releasable by a control device.

3. A device according to claim 2, characterized in that the transfer plates form the bottom of transfer compartments comprised of frames disposed at the periphery of the transfer table and of the transfer plates.

4. A device according to claim 3, characterized in that the swing drives engage with swing axes of the transfer plates disposed side-wise above the frames.

5. A device according to claim 4, characterized in that the swing drives comprise a drive for development of oppositely directed swinging motion and of a drive motor associated with same.

6. A device according to claim 5, characterized in that the drive motors are pneumatically actuated cylinders.

7. A device according to claim 5, characterized in that the drive motors are electromagnets or electric motors.

8. A device according to claim 7, characterized in that the transfer table is provided with a cover plate extending slightly conically upwardly.

9. A device according to claim 8, characterized in that the transfer table is associated with cleaning devices for the still open transfer plates, disposed behind the region of transfer onto the conveyor belt in the direction of rotation.

10. A device according to claim 3, characterized in that, as a control device in the section of the transfer table disposed above the conveyor belt is provided at least one support roller which is swingable from a position supporting the transfer plates to a position setting the transfer plates free.

11. A device according to claim 10, characterized in that the support roller is secured to a control arm which is connected with a pressure cylinder.

12. A device according to claim 11, characterized in that the control arm is of an L-shaped configuration and carries on its shorter shank the supporting roller.

13. A device according to claim 12, characterized in that the longer shank of the control arm is disposed in a plane parallel with the plane of the conveyor belt and is displaceable along such plane by a pressure cylinder provided within the contour of the transfer table.

14. A device according to claim 13, characterized in that near the conveyor belt, behind same in the sense of direction of rotation of the transfer table and underneath the transfer compartments, guide rails are provided for closing the transfer plates.

15. A device according to claim 14, characterized in that the transfer plates are spring loaded in the direction of the swinging motion.

16. A device according to claim 15, characterized in that in the section in which the transfer plates are closed, guide rollers are arranged on the support structure of the transfer table, immediately underneath the transfer plates.

* * * * *